(12) United States Patent
Peng et al.

(10) Patent No.: US 11,783,604 B2
(45) Date of Patent: Oct. 10, 2023

(54) METHOD FOR CREATING HISTOPATHOLOGICAL GROUND TRUTH MASKS USING SLIDE RESTAINING

(71) Applicant: GOOGLE LLC, Monntain View, CA (US)

(72) Inventors: Lily Peng, Mountain View, CA (US); Martin Stumpe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 463 days.

(21) Appl. No.: 16/959,725

(22) PCT Filed: Jan. 11, 2018

(86) PCT No.: PCT/US2018/013353
§ 371 (c)(1),
(2) Date: Jul. 2, 2020

(87) PCT Pub. No.: WO2019/139591
PCT Pub. Date: Jul. 18, 2019

(65) Prior Publication Data
US 2020/0372235 A1     Nov. 26, 2020

(51) Int. Cl.
*G06V 20/69* (2022.01)
*G01N 1/30* (2006.01)
(Continued)

(52) U.S. Cl.
CPC ............. *G06V 20/695* (2022.01); *G01N 1/30* (2013.01); *G01N 1/34* (2013.01); *G06T 7/0012* (2013.01);
(Continued)

(58) Field of Classification Search
None
See application file for complete search history.

(56) References Cited

U.S. PATENT DOCUMENTS 8,351,676 B2   1/2013   Dai et al.
9,518,982 B2   12/2016  Sood et al.
(Continued)

FOREIGN PATENT DOCUMENTS

WO   2018153133   8/2018

OTHER PUBLICATIONS

The International Search Report (ISR) with Written Opinion for PCT/US2018/013353, dated Sep. 27, 2018, pp. 1-14.
Anonymous: "Histology—Wikipedia" Apr. 11, 2017 (Apr. 11, 2017), XP055506212, Retrieved from the Internet: URL:https://en.wikipedia.org/w/index.php?title=Histology&oldid=774849765 [retrieved on Sep. 11, 2018].
(Continued)

*Primary Examiner* — Nancy Bitar
(74) *Attorney, Agent, or Firm* — McDonnell Boehnen Hulbert & Berghoff LLP

(57) ABSTRACT

A method for generating a ground truth mask for a microscope slide having a tissue specimen placed thereon includes a step of staining the tissue specimen with hematoxylin and eosin (H&E) staining agents. A first magnified image of the H&E stained tissue specimen is obtained, e.g., with a whole slide scanner. The H&E staining agents are then washed from the tissue specimen. A second, different stain is applied to the tissue specimen, e.g., a special stain such as an IHC stain. A second magnified image of the tissue specimen stained with the second, different stain is obtained. The first and second magnified images are then registered to each other. An annotation (e.g., drawing operation) is then performed on either the first or the second magnified images so as to form a ground truth mask, the ground truth mask in the form of closed polygon region enclosing tumor cells present in either the first or second magnified image.

23 Claims, 4 Drawing Sheets

(51) Int. Cl.
  *G01N 1/34*    (2006.01)
  *G06T 7/00*    (2017.01)
(52) U.S. Cl.
  CPC ............... *G06T 2207/20081* (2013.01); *G06T 2207/20084* (2013.01); *G06T 2207/30024* (2013.01)

(56) References Cited

U.S. PATENT DOCUMENTS

| | | | |
|---|---|---|---|
| 10,013,781 | B1 | 7/2018 | Gammage et al. |
| 2011/0286654 | A1* | 11/2011 | Krishnan ................. G06T 7/155 382/128 |
| 2016/0335478 | A1 | 11/2016 | Bredno et al. |
| 2017/0160171 | A1 | 6/2017 | Tsujikawa et al. |
| 2017/0322124 | A1* | 11/2017 | Barnes ....................... G06T 7/33 |
| 2017/0372471 | A1* | 12/2017 | Eurèn ................... G06T 7/0012 |
| 2019/0188446 | A1* | 6/2019 | Wu ........................ G06T 3/0075 |
| 2020/0372235 | A1* | 11/2020 | Peng ........................ G01N 1/30 |

OTHER PUBLICATIONS

Helin, Henrik O. et al. "Virtual Microscopy in Prostate Histopathology: Simultaneous Viewing of Biopsies Stained Sequentially With Hematoxylin and Eosin, and α-Methylacyl-Coenzyme A Racemase/p63 Immunohistochemistry" The Journal of Urology (2006) vol. 175, pp. 495-499.
Szegedy, Christian et al. "Going Deeper with Convolutions" arXiv:1409.4842 [cs.CV] (Sep. 2014).
Szegedy, Christian et al. "Rethinking the Inception Architecture for Computer Vision" arXiv:1512.00567 [cs.CV] Dec. 2015).
Szegedy, Christian et al. "Inception-v4, Inception-ResNet and the Impact of Residual Connections on Learning" arXiv:1602.0761 [cs.CV] (Feb. 2016).
Second Written Opinion of the International Preliminary Examining Authority for PCT/US2018/013353, dated Nov. 29, 2019, pp. 1-5.
"Combining Deep Learning and Structured Prediction for Segmenting Masses in Mammograms"; Neeraj Dhungel, et al.; "Computer Vision and Machine Learning with RGB-D Sensors," Chapter 13, pp. 225-240; Springer International Publishing (Jul. 14, 2017).
"Artificial Neural Networks in Cancer Diagnosis, Prognosis, and Patient Management (Chapter 3, III)"; R.N.G. Naguib et al. (Feb. 2, 2001).

* cited by examiner

METHOD FOR CREATING HISTOPATHOLOGICAL GROUND TRUTH MASKS USING SLIDE RESTAINING

CROSS REFERENCE TO RELATED APPLICATIONS

The present application claims priority as a U.S. national stage entry of PCT application serial no. PCT/US2018/013353 filed Jan. 11, 2018. The full disclosure of PCT/US2018/013353 is incorporated herein by reference.

BACKGROUND

This disclosure relates to the field of digital pathology and more particularly to a method for generating a ground truth mask in a digital image of a tissue specimen. The term "mask" in this document refers to a closed polygon region in an image of the tissue specimen enclosing a region of interest, such as tumor cells (for example cancer). The term "ground truth" in this document means that the mask, and a label that may be assigned to the tissue specimen such as "cancerous," is provided by direct observation of the specimen (i.e., empirical evidence) as opposed to information provided by inference.

Digital images of tissue samples with a ground truth mask and an associated label for the sample, such as "cancerous", are used in several contexts, including as training examples for constructing machine learning models. Such machine learning models can be developed for various purposes, including aiding in diagnosis, clinical decision support and for making predictions for the patient providing the tissue sample, such as predicting survival, or response to treatment.

Machine learning models for making predictions from images of slides containing tissue specimens require accurate ground truth masks and assignment of a label to the specimens. As noted above, the masks are in the form of polygons that are outlining regions of interest, such as tumor cells. One example of a method for creating a mask is described in the pending U.S. patent application of C. Gammage, Ser. No. 15/621,837 filed Jun. 13, 2017, the content of which is incorporated by reference herein. Creating accurate ground truth masks and assigning labels is very labor-intense and fatiguing, and moreover pathologists make grading errors. This disclosure describes a method for creating ground truth masks more accurately and faster.

Neural network pattern recognizers for recognizing cancerous cells in digital magnified images of tissue specimens is disclosed in PCT application serial no. PCT/US2017/019051 filed Feb. 23, 2017, and in the scientific and technical literature cited therein, the content of which is incorporated by reference. The Inception-v3 deep convolutional neural network architecture, upon which the present pattern recognizers are based, is described in the scientific literature. See the following references, the content of which is incorporated by reference herein: C. Szegedy et al., *Going Deeper with Convolutions*, arXiv-1409.4842 [cs.CV] (September 2014); C. Szegedy et al., *Rethinking the Inception Architecture for Computer Vision*, arXiv:1512.00567 [cs.CV] (December 2015); see also US patent application of C. Szegedy et al., "*Processing Images Using Deep Neural Networks*", Ser. No. 14/839,452 filed Aug. 28, 2015. A fourth generation, known as Inception-v4 is considered an alternative architecture for the pattern recognizers. See C. Szegedy et al., Inception-v4, *Inception-ResNet and the Impact of Residual Connections on Learning*, arXiv1602.0761 [cs.CV] (February 2016). See also US patent application of C. Vanhoucke, "Image Classification Neural Networks", Ser. No. 15/395,530 filed Dec. 30, 2016. The description of the convolutional neural networks in these papers and patent applications is incorporated by reference herein.

In pathology today, cancer staging and diagnosis from tissue samples is commonly done on H&E (hematoxylin and eosin) stained tissue specimens. Additionally, machine learning models are typically trained from images of H&E stained tissue specimens. The H&E stain is an unspecific stain which highlights the overall morphology of the tissue. In contrast, there are special stains (including among others immunohistochemical stains, IHCs, Verhoeff's stain, Masson's trichrome stain) that highlight specific antigens, such as tumor markers. Pathologists can usually render a diagnosis, and outline the tumor on H&E images, but sometimes require special stains such as IHC stained images for difficult cases. It is also believed that the use of an IHC stained (or other special stained) slide speeds up the human examination and annotation process. However, as a general matter, a tissue slide can either have an H&E stain or an IHC stain, but usually not both at the same time. A common solution therefore is to cut serial sections of tissue and subject them both to staining, microscopy and capture of digital images, where section N is stained with H&E, and section N+1 is stained with an IHC stain, so that the IHC stained tissue is morphologically similar enough (about 5 microns away, which is ~5% of a human cell diameter) to be used alongside the H&E stained tissue image. However, the morphological differences in serial sections are still significant and can lead to inaccuracies in ground truth labels and masks generated in this fashion. Another factor that further increases morphological differences for serial sections is that the two sections are handled separately during processing, and the two tissues might get stretched slightly differently during the processing (e.g. when putting the freshly cut glass section on the glass carrier).

SUMMARY

In one aspect, the present disclosure makes use of a technique called "restaining" of a single tissue specimen on a slide for creating accurate ground truth masks and associated labels for tissue specimens. Whereas in the above-described prior art method in which different, serial sections of a tissue sample are obtained and two different tissue samples are subject to H&E staining/imaging and IHC (or other special) staining/imaging, the methods of this disclosure provide for creating ground truth masks using H&E and special staining from a single tissue specimen. This way, the tissue for both images will be identical, and accordingly transforming ground truth masks from both a special stained image and an H&E stained image is possible and readily accomplished.

In one aspect there is provided a method for generating a mask for a digital image of a tissue sample. The method comprises receiving first image data, the first image data representing the tissue sample stained with a first staining agent (e.g., H&E); receiving second image data, the second image data representing the tissue sample after washing the tissue sample to remove the first staining agent from the tissue specimen and staining the tissue sample with a second staining agent (e.g., a special stain); registering the first and second image data to generate registration data; receiving data indicating a region of interest represented in the second image data; and determining a mask in the first image data based upon the received data indicating a region of interest represented in the second image data and the registration data. The identification of data indicating a region of interest in the second image data may be performed by a user (annotation, herein) or it may be performed algorithmically. Once the region of interest is identified and mask created in the second image data it can be transferred to the first image data due to the registration of the first and second images.

The method can of course be performed on a multitude of slides containing tissue specimens, thereby building up a training set of H&E slides with ground truth masks around cancer or other cells. Such a set of digital images can be provided to a neural network pattern recognizer as a training set for training the pattern recognizer. The neural network pattern recognizer could be for example of the design cited in the scientific and patent literature cited previously.

In some aspects the method may further comprise one or more of the following features. A mask and the second image data can be supplied to a neural network pattern recognizer as a training example for automatic recognition of regions of interest. The data indicating a region of interest represented in the first image data may be a region of interest comprising cells determined to be cancer cells. Receiving data indicating a region of interest represented in the first image data may comprise processing the first image data, e.g., in an algorithmic or automatic process in software. For example, processing the first image data may comprise determining pixels of the first image data having a predetermined value, e.g., above a stain color threshold. Processing the first image data may comprise processing the first image data using a trained classifier or pattern recognizer. The data indicating a region of interest represented in the first image data may be annotation data input by a user. Receiving data indicating a region of interest represented in the first image data may comprise displaying the first image data to the user. Receiving data indicating a region of interest represented in the first image data may comprise displaying the first and second image data side-by-side. I In one aspect a method is provided for generating a ground truth mask and label associated with a microscope slide containing a tissue sample. The method assumes as input a tissue sample is prepared (e.g., formalin fixed and paraffin embedded) and applied to a microscope slide. The methodology is as follows:

1. The slide is stained with a first staining agent (e.g., hematoxylin and eosin (H&E), a widely known cell staining procedure).

2. The stained slide is scanned and imaged by a whole slide scanner having a high resolution digital camera, typically at a magnification M such as 10×, 20×, or 40×. This first digital image of the slide stained with the first staining agent (e.g., H&E) is stored in memory, e.g., in the memory of the whole slide scanner or the memory of an associated pathology workstation.

3. The slide is then subject to a washing step to wash out the first staining agent from the tissue on the slide.

4. A second, different (i.e., special) staining agent is applied to the slide. This second or special staining agent could be for sample one of a variety of immunohistochemical (IHC) stains such as PIN4 for prostate cancer, or cytokeratin AE1/AE3 for epithelial cell metastasis in lymph nodes, Verhoeff's stain, Masson's trichrome stain, etc. In this disclosure, the restaining, represented by the term "second staining agent", is intended to encompass a second stain consisting of a single special stain and also a plurality of special stains, sometimes referred to in the art as "stain multiplexing".

5. The slide stained with the second staining agent is scanned and imaged by the whole slide scanner with electronic camera at the same magnification level M. This second digital image of the slide is again stored in memory.

6. The first and second digital images of the slide are aligned and registered with respect to each other. Given that the tissue is physically the same, residual alignment error should be close to zero.

7. Annotate either the first or the second digital images so as to form a ground truth mask, the ground truth mask in the form of closed polygon region enclosing tumor cells present in either the first or second image. For example, the registered first and second digital images are displayed together (either superimposed or as a pair of images side by side) and used by a human annotator using tools on a workstation to generate (i.e., draw) a ground truth mask on the slide image and assign a label for the slide. For example, the human annotator could draw a polygon outline of cancer cells (i.e., the mask) on the second image, or the first image. One example of the drawings could be in accordance with the teachings of pending U.S. patent application of C. Gammage, Ser. No. 15/621,837 filed Jun. 13, 2017. If the annotator draws the mask on the second image, the mask is transferred to the first (H&E) image, which is possible because the two images are in mutual alignment or registration.

In one variation of the above method, steps 1-6 are performed but the ground truth mask is created from the second (special stain) image algorithmically (i.e., automatically using software instructions), and the ground truth mask is transferred to the first (H&E) image. The algorithmic creation of the ground truth mask in the second image could be performed using one of several possible techniques:

a) thresholding the second image on certain stain colors and drawing a polygon around regions having pixels with the stain color above the threshold; or b) using a neural network or other classifier trained to recognize cancer cells in stained tissue sample images and applying the classifier to the second image.

In one possible embodiment, after the ground truth mask and label is created, in either variation above, the first digital image (H&E) with mask and label is then supplied as a training instance to a machine learning system being trained to recognize cancer cells in stained tissue images.

In another aspect, a method for generating a ground truth mask for a digital image of a tissue sample is provided. The tissue sample placed on microscope slide. The method includes the steps of:

a) obtaining a first magnified image of the tissue specimen stained with a first staining agent;

b) obtaining a second magnified image of the tissue specimen stained with a second, different staining agent;

c) registering the first and second magnified images to each other; and d) forming a ground truth mask in the second magnified image, the ground truth mask in the form of closed polygon region enclosing region of interest cells present in the second magnified image; and e) transferring the ground truth mask from the second magnified image to the first magnified image.

In still another aspect, a workstation is provided which comprises a processing unit and a display. The display is configured to display registered digital magnified images of a single slide containing a tissue specimen stained in seriatim (1) with hematoxylin and eosin and (2) a second, different staining agent, respectively. The workstation is configured with either (a) user interface tools by which an operator inspecting the registered digital magnified images on the display may annotate a digital magnified image of the tissue specimen stained with the second staining agent so as to form a closed polygon around a region of said image containing region of interest cells to thereby create the ground truth mask, or (b) code to algorithmically create a ground truth mask in the image. The workstation is also configured to transfer the ground truth mask to the digital magnified image of the tissue specimen stained with hematoxylin and eosin.

In still another aspect, a system is disclosed for creating ground truth masks in digital magnified images of tissue specimen. The system includes in combination a whole slide scanner for scanning stained slides containing a tissue sample, a wash station configured with apparatus and chemicals for washing H&E staining agents from the tissue samples; and a pathology workstation as recited in the previous paragraph.

The pathology workstation or the system above may further include a machine learning system for building machine learning models from training examples from digital magnified images of tissue specimens stained with hematoxylin and eosin. The training examples are in the form of digital magnified pathology images annotated by the pathology workstation and methods of this disclosure.

The methods described herein may be used to obtain images of a tissue sample stained with a commonly used stain, for example hematoxylin and eosin, in which a region of interest is identified that is typically difficult to identify in images stained with the commonly used stain. This may be achieved by identifying the region of interest in an image of the same tissue sample that is stained with a different stain, for example an immunohistochemical (IHC) stain, that allows the region of interest to be identified more easily, either by manual input by a trained operator using the image or by using image processing techniques. The images stained with the commonly used stain with the region of interest identified can be used to train a neural network to identify a corresponding region of interest in an image that is stained with the same stain. Such a trained neural network may be able to identify a region of interest with a certain property, for example a region of interest including cancerous cells, using images that human operators typically find challenging to identify the region of interest. In this way, images that are obtained using a commonly used stain such as H&E may be used to identify regions of interest that are not generally possible to be identified by human operators.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

DETAILED DESCRIPTION

Figure 1:
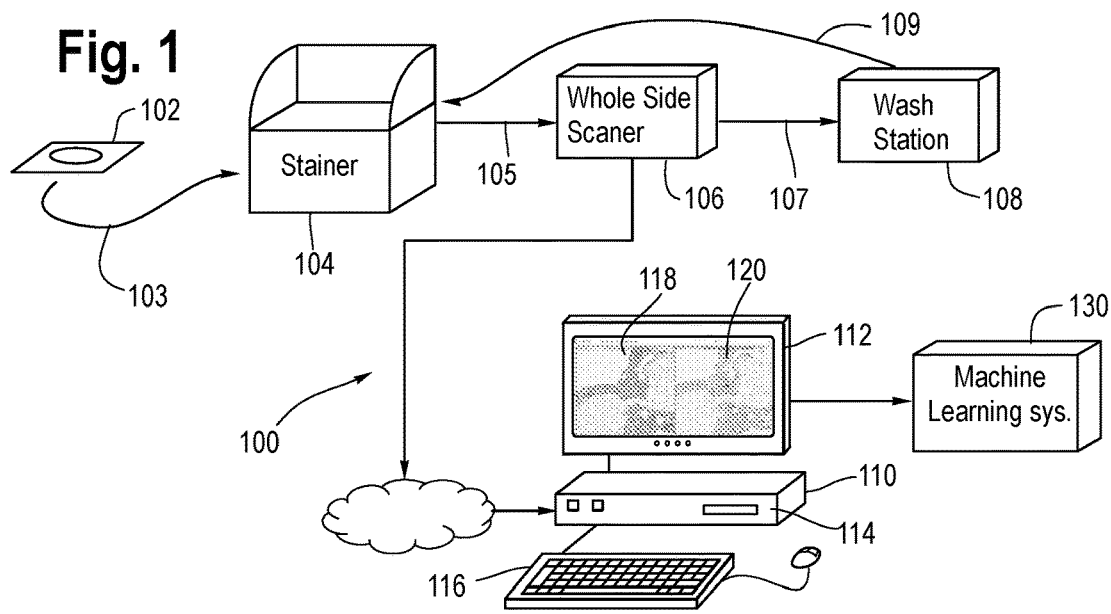
FIG. 1 is an illustration of a laboratory environment including pathology workstation in which the method is practiced.

Attention will now be directed to FIG. 1 which is an illustration of a laboratory 100 environment in which the method is practiced. A tissue sample, typically formalin fixed and typically paraffin embedded, is placed onto a microscope slide 102 and the tissue sample is placed into a stainer 104 which applies stains to the tissue sample. Commercial stainers for applying H&E, IHC and other special stains to tissue samples are known and available from a variety of vendors. Initially, the stainer 104 stains the slide with H&E staining agents, and a cover slip is placed over the tissue sample. The slide is then supplied as indicated at 105 to a whole slide scanner 106. Such scanners are also widely known and available from a variety of vendors. The whole slide scanner 106 scans the slide at a user specified magnification, such as 10×, 20× or 40×. The whole slide scanner includes a digital camera for capturing magnified, color digital images of the specimen. The digital magnified image of the H&E stained slide is then stored, either locally in the whole slide scanner 106, in the cloud network, or on the local hard disk 114 of a pathology workstation 110.

The slide, after having been scanned by the whole slide scanner 106, is then sent to a wash station 108 containing washing apparatus and associated chemicals and trained personnel to wash out (i.e., remove) the H&E staining agents such that the slide can be re-stained with a second, different stain, such as a special stain, e.g., IHC stain, or multiplex stain. The wash station 108 includes apparatus and chemicals so that the user can perform any well-known procedure for washing H&E staining agents from a tissue specimen. In one example, the following procedure is employed:

1. Soak the slide in xylene to remove the coverslip.
2. Once the coverslip is removed, rinse the slide several times with xylene. Then perform 2 to 3 rinses of the slide with EtOH, then several rinses with water. Most of the eosin will typically rinse out in water. Now place the slide in acid alcohol for a minute or two. Rinse the slide again in water.

After the procedure for washing H&E staining agents from a tissue specimen is performed, the slide is then sent back to the stainer 104 as indicated at 109 and the slide is stained with a second, different or special stain, e.g., an IHC stain, then sent as indicated at 105 to the whole slide scanner 106. The slide is scanned and imaged in the scanner 106 at the same magnification as the first (H&E) image and the second digital magnified image of the slide stained with the second, different stain is stored in memory, e.g., in the scanner, in the cloud or on the hard disk 114 of the workstation 110.

The two digital magnified images of the tissue sample are then registered to each other. The registration may be performed in any convenient way, for example using well known image processing techniques to determine the X/Y coordinates for various key features in the images, such as areas of high contrast, corners, boundaries, etc. so that the X/pixel location of each of the key features of one of the images can be correlated or matched to the X/Y pixel locations of the same key features in the other image. In one embodiment we use SIFT (a feature extraction method) to determine areas with sharpness or color distribution gradients to identify key features or locations in the image (for example 10 key features) and determine matching feature vectors. The registration step is performed for two reasons: 1) so that the first and second images, 118 and 120 respectively (FIG. 1) can be displayed side by side or on top of each other on the display 112 of the workstation in a coordinated manner, and 2) when the user annotates one image, usually the second (IHC) image 120 to draw the mask, the X/Y locations of each vertex in the mask (polygon) can be transferred to the first (H&E) image. The workstation includes user interface tools including the keyboard 116, mouse and display 112 to facilitate annotation of the image to draw the mask and assign a label to the specimen, e.g., "cancerous."

Figure 6:
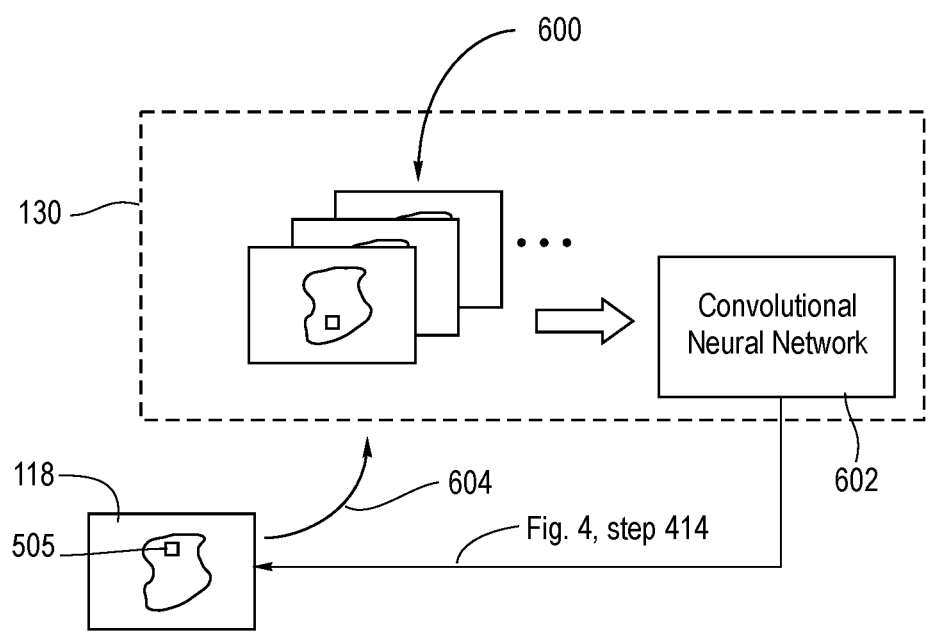
FIG. 6 is a more detailed illustration of the machine learning system of FIG. 1.

After the annotation process to generate the mask and assign the label to the specimen has been performed, in one embodiment the annotated H&E image of the tissue specimen with the mask is supplied to a machine learning system 130 as a training example for training a machine learning model in the system 130. This aspect will be described in greater detail in conjunction with FIG. 6 later in this document.

Figure 2:
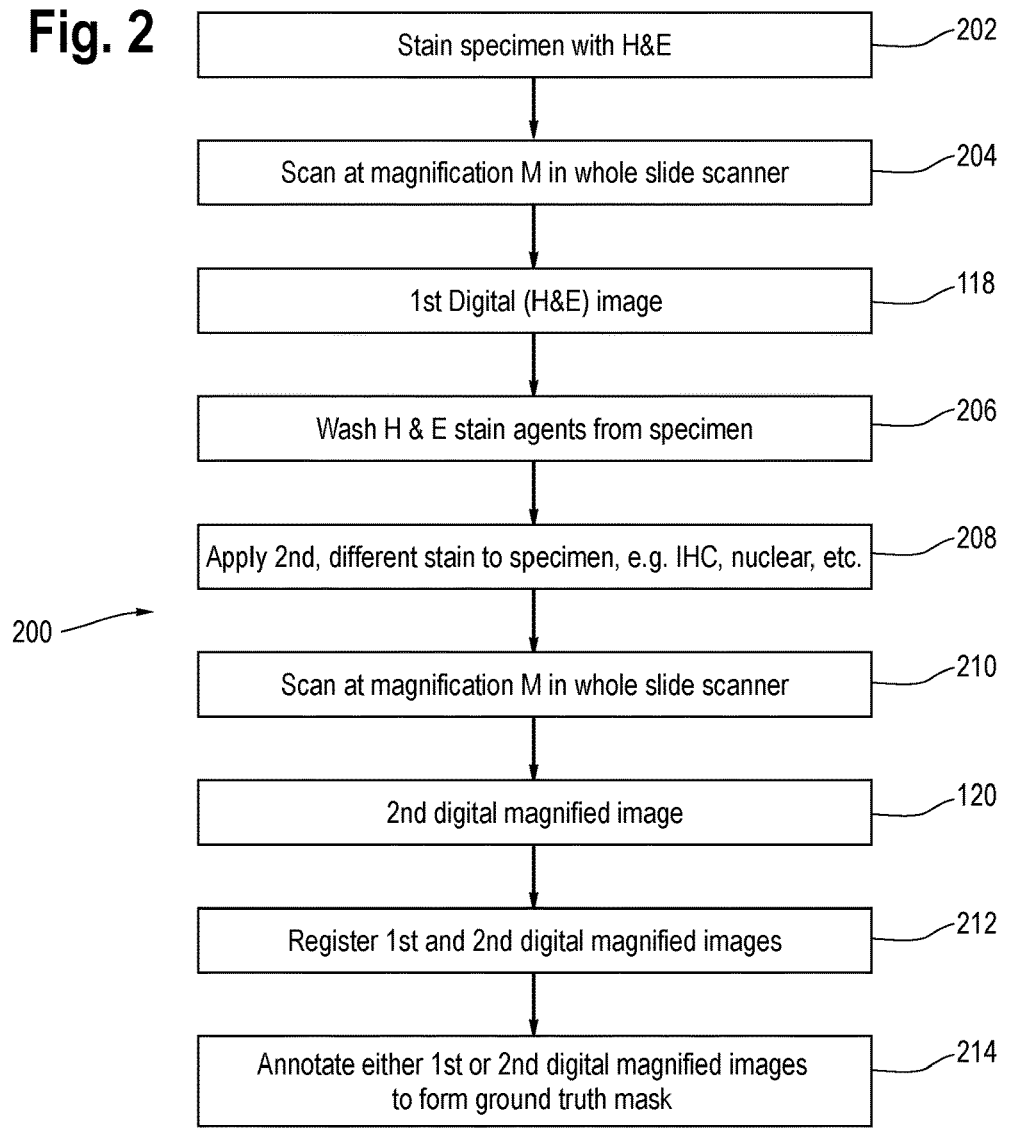
FIG. 2 is a flowchart showing the methodology for generating a ground truth mask in accordance with one embodiment.

FIG. 2 is a flowchart showing the methodology for generating a ground truth mask in a stained tissue specimen in accordance with one embodiment using the system of FIG. 1 as described above. In step 202 the specimen is stained with H&E staining agents. At step 204 the slide containing the stained tissue specimen is scanned at magnification M (e.g., 10×, 20, and/or 40×) in the whole slide scanner 106. The scanner produces the first digital (H&E) image 118. At step 206 the H&E staining agents are washed from the specimen, for example using the wash station 108 of FIG. 1. At step 208, a second, different stain is applied to the specimen, for example via the stainer 104 of FIG. 1. The second stain may be, for example, an IHC stain, a nuclear stain, or some other special stain pertinent to the tissue type or possible disease state at issue. At step 210 the slide with the specimen stained with the second, different stain is scanned with the whole slide scanner. The slide is typically scanned at the same magnification M as the slide was scanned at when it was stained with H&E, however it is possible to scan at one magnification, and either downsample or upsample the image data to obtain digital image data at other magnifications that may be used. The second digital image is indicated at 120 in FIGS. 1 and 2.

At step 212 the two digital images are registered to each other, as explained above.

At step 214, the creation of the ground truth mask, e.g., using user interface tools and the side by side display of the registered images is performed. The user annotates either the first or second digital image on the workstation 112 as indicated in FIG. 1. The user annotation is used to generate the ground truth mask in the digital images. If the mask is created in the second image it is transferred to the first (H&E) image.

Figure 3:
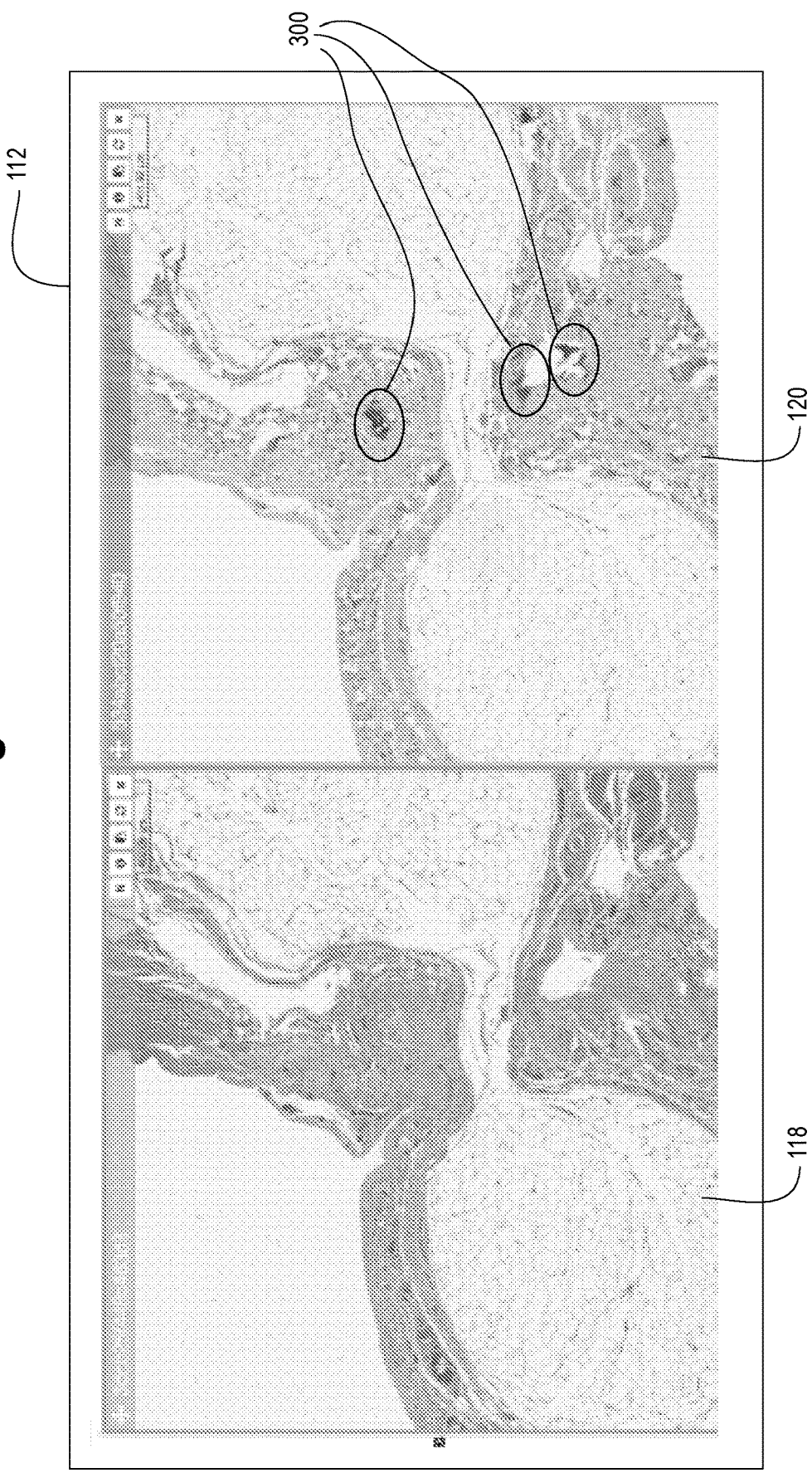
FIG. 3 is an illustration of registered H&E and IHC magnified images of the same tissue sample shown side by side, with the IHC images having regions of darker contrast indicating cancerous cells in the tissue sample.
Figure 5:
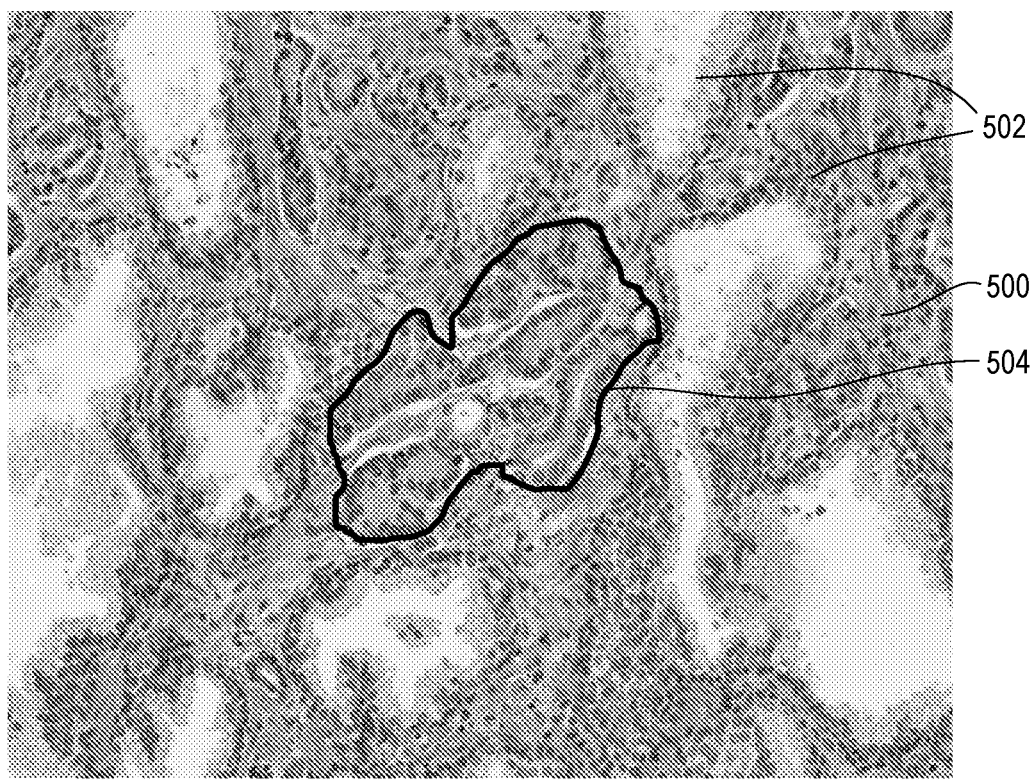
FIG. 5 is an illustration of a portion of a tissue sample image in which a mask is drawn or created algorithmically over a region of interest, such as tumor cells. It will be understood that for some tissue specimens there may be more than one mask created for a given slide image.

FIG. 3 is an illustration of registered H&E 118 and IHC 120 magnified images of the same tissue sample shown side by side, with the IHC image having regions of darker contrast indicating cancerous cells in the tissue sample. As one example of the annotation process, and referring now to FIG. 3, the user views the side-by-side display of the two digital images, and by inspection of the IHC image 120 sees the dark brown areas of high contrast 300 in the IHC image and then proceeds using simple drawing tools using the keyboard or more typically a mouse (or a touch sensitive display 112) to draw a polygon around the dark areas within the high contrast regions 300. This drawing may be done with the techniques of the Gammage U.S. patent application cited previously. The user may wish to zoom in to see the areas 300 in greater detail. When they use zoom controls on the display both images 118 and 120 are zoomed in tandem and remain in registration or alignment so that the user can see the same detail in both images. When the polygon region is drawn in one image of the images, the mask is automatically created over the identical pixels X/Y addresses in the other image of the images since the two images are in registration. Note further that in this method the two images 118 and 120 are of the same exact tissue since only one tissue sample is used and it is stained and imaged in H&E and in IHC stains in seriatim. FIG. 5 is an illustrative example of a mask 504 (line) that is created in an image of a tissue specimen 500 having various tissue features 502. The mask 504 is a closed polygon region having any arbitrary boundary consisting of vertices and connecting lines. Typically the mask is highly irregular in shape and is constructed in accordance with the procedure of FIG. 2 manually by a user (typically a trained pathologist) operating the workstation and using simple controls on the user interface of the workstation to draw the perimeter of the mask. The X/Y locations of the vertices of the mask boundary in the IHC image are stored in memory so that the mask can be transferred to the first (H&E) image.

Figure 4:
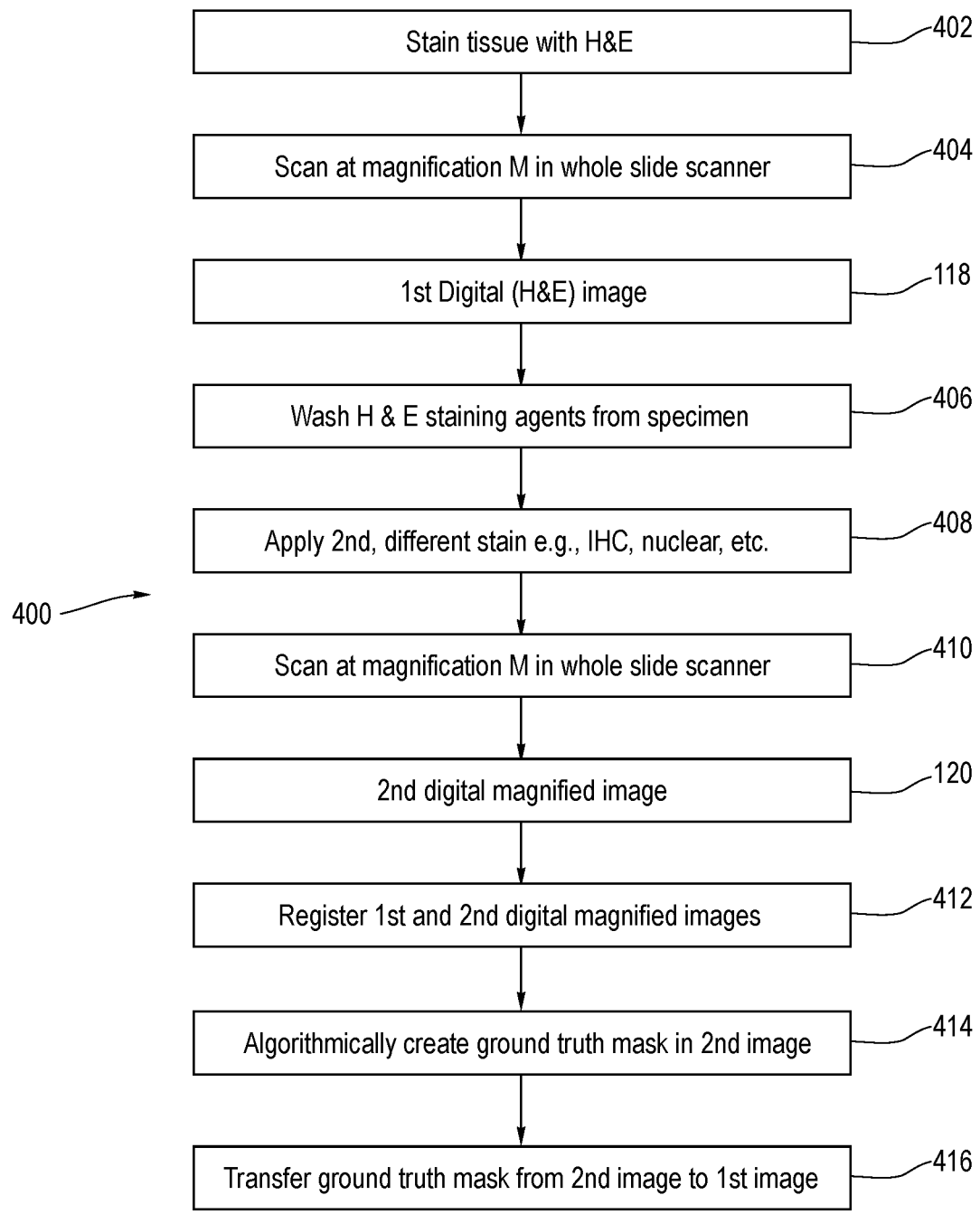
FIG. 4 is a flowchart of a second embodiment of the method in which the ground truth mask is created algorithmically in the second magnified image (e.g., IHC image).

A second embodiment of the method for generating the ground truth mask, this time automatically or algorithmically, will be described in conjunction with FIG. 4. The method is basically the same as the procedure of FIG. 6 up to the image registration step. In particular, at step 402, the tissue sample is stained with H&E, at step 404 the specimen is scanned at magnification M in the whole slide scanner, and a first digital H&E image is generated 118. At step 406 the H&E staining agents are washed from the specimen. At step 408, the slide is returned to the stainer of FIG. 1 and a second, different stain is applied to the sample, e.g., an IHC stain. At step 410 the slide with the second stain is scanned in the whole slide scanner at magnification M, producing the second digital image 120. At step 412, the first and second digital images are registered to each other as explained above.

At step 414, a ground truth mask is algorithmically generated in the second digital image 120. Image analysis or classification methods are performed in software on the second (IHC) image to identify cancer cells in the image, and then construct a closed polygon around such cells. The construction of closed polygons may be limited to detection of cancer cells in regions that have a minimum size so as to create more useful masks and avoid creation of masks of isolated cells or small groups of cells. The algorithmic creation of the ground truth mask in the second image could be performed using one of several possible techniques:

a) thresholding the second image on certain stain colors and drawing a polygon around regions having pixels with the stain color above the threshold; or b) using a neural network or other pattern recognition classifier trained to recognize cancer cells in stained tissue sample images to find cancer cells in the second image. Neural network and other classification methods for automatic detection of regions of interest and cancer cells in digital images, e.g., based on cellular morphology and pixel intensity variations in stained digital images, is known in the art and therefore a detailed description is omitted for the sake of brevity. See e.g., the discussion of PCT/US2017/019051 filed Feb. 23, 2017 and scientific and patent literature cited previously.

Once either of the above methods have been performed, the X/Y coordinates of the vertices of the polygon forming the mask is stored. The mask then can be reproduced on the workstation display by showing the mask in the IHC image 120.

Additionally, the mask algorithmically created from the IHC image is then transferred to the H&E image 120. This is possible due to the registration of the two images, and because the known X/Y locations of the vertices in the IHC image 120 translate directly to the H&E image. This step is useful for generating training instances for the machine learning system 130 of FIG. 1. In particular, the machine learning system 130, shown in greater detail in FIG. 6, includes a multitude of training instances 600 in the form of magnified H&E digital images of tissue specimens each with a mask or boundary (shown as a small rectangle in FIG. 6) which delineates ground truth presence of cancer cells in that region. The training instances 600 are used to train a classification engine, such as a convolutional neural network (CNN) pattern recognizer 602, to recognize the presence of cancer cells in tissue samples of the type in the training instances 600 (e.g., prostate, breast, lymph, brain, or other tissue type). As indicated at 604, the H&E image 118 with the mask 505 (created in accordance with FIG. 2 or FIG. 4 procedure) is then added to the set of training instances 600. Additionally, once a suitable number of training instances 600 have been obtained and the performance of the CNN pattern recognizer 602 reached a point of high accuracy (and validated with a suitable separate test set of images) then the CNN pattern recognizer 602 can be used to perform step 414 of FIG. 4 and generate the mask 505. The training set 600 can be obtained from a library of tissue sections that can be subject to the staining, re-staining and imaging steps of this disclosure.

Compared to using only H&E images for creating a ground truth mask, the special stain (e.g., IHC) image provides much more specific insights into the cellular and nuclear morphology and easier visibility due to higher contrast of regions of interest resulting from the stain. Compared to using serial tissue sections stained with H&E and IHC, which are typically 5 micrometers apart, the re-staining approach of this disclosure offers the advantages that (1) both images can be aligned perfectly with the minimum possible residual alignment error, and (2) since the exact same tissue is used, every feature present in one image is also present in the other image. For instance if a tiny tumor region is in one slide, it would be possible that it is not visible in the adjacent serial section slide. However, with re-staining that is not the case. Furthermore, the re-staining approach allows for near exact registration of H&E and IHC images and therefore easy translation of a ground truth mask from an IHC image to an H&E image.

While it is expected in most instances that the tissue specimen will be stained first with H&E and then with the second, special stain, this is not absolutely necessary and it is possible to stain initially with the special stain (e.g., an IHC stain), collect the digital image at magnification M, wash out the special stain, and then re-stain with H&E and then capture the H&E image at magnification M. This "reverse" way may likely have lower image quality in the H&E image due to more re-staining artifacts when trying to wash out the special stain.

What is claimed is:

1. A method comprising:
   obtaining target image data, the target image data representing a target tissue sample stained with hematoxylin and eosin; and
   applying the target image data to a trained neural network pattern analyser to identify regions of interest that exhibit a specified disease state within the target image data, wherein the trained neural network has been trained by:
      receiving first image data, the first image data representing a training tissue sample stained with a first staining agent, wherein the first staining agent comprises hematoxylin and eosin;
      receiving second image data, the second image data representing the training tissue sample after washing the training tissue sample to remove the first staining agent from the training tissue sample and staining the training tissue sample with a second, different staining agent, wherein the second staining agent comprises an immunohistochemical (IHC) stain that stains cells in the training tissue sample that exhibit the specified disease state;
      registering the first and second image data to generate registration data;
      receiving data indicating a region of interest represented in the second image data that depicts cells exhibiting the specified disease state;
      determining a mask in the first image data based upon the region of interest represented in the second image data and the registration data; and
   based on the first image data and the mask in the first image data, training the neural network pattern analyser to identify regions of interest that exhibit the specified disease state within image data that represents tissue samples stained with hematoxylin and eosin.

2. A method according to claim 1, wherein washing the training tissue sample to remove the first staining agent from the training tissue sample comprises rinsing with xylene, rinsing with EtOH, rinsing with water, or placing in acid alcohol.

3. A method according to claim 1, wherein the region of interest represented in the second image data is a region of interest comprising cells determined to be cancer cells.

4. A method according to claim 1, wherein receiving data indicating the region of interest represented in the second image data comprises processing the second image data.

5. A method according to claim 4, wherein processing the second image data comprises determining pixels of the second image data having a predetermined value.

6. A method according to claim 5, wherein processing the second image data comprises processing the second image data using a trained classifier.

7. A method according to claim 1, wherein the second staining agent comprises PIN4, cytokeratin AE1/AE3, Verhoeff's stain, or Masson's trichrome stain.

8. A method according to claim 1, wherein the region of interest represented in the second image data corresponds to annotation data input by a user.

9. A method according to claim 8, wherein receiving data indicating a region of interest represented in the second image data comprises displaying the second image data to the user.

10. A method according to claim 8, wherein receiving data indicating a region of interest represented in the second image data comprises displaying the first and second image data side-by-side.

11. A method for training a neural network pattern analyser using a digital image of a tissue sample, wherein the tissue sample is placed on a microscope slide, the method comprising:
   a) obtaining a first magnified image of the tissue sample stained with a first staining agent, wherein the first staining agent comprises hematoxylin and eosin;
   b) obtaining a second magnified image of the tissue sample stained with a second, different staining agent after washing the tissue sample to remove the first staining agent, wherein the second staining agent comprises an immunohistochemical (IHC) stain that stains cells in the tissue sample that exhibit a specified disease state;
   c) registering the first and second magnified images to each other;
   d) forming a ground truth mask in the second magnified image, the ground truth mask in the form of closed polygon region enclosing region of interest cells present in the second magnified image that exhibit the specified disease state;
   e) transferring the ground truth mask from the second magnified image to the first magnified image; and
   f) based on the first magnified image and the ground truth mask in the first magnified image, training a neural network pattern analyser to identify regions of interest that exhibit the specified disease state within magnified images that represent tissue samples stained with hematoxylin and eosin.

12. The method of claim 11 wherein washing the tissue sample to remove the first staining agent comprises rinsing with xylene, rinsing with EtOH, rinsing with water, or placing in acid alcohol.

13. The method of claim 11, wherein the second staining agent comprises PIN4, cytokeratin AE1/AE3, Verhoeff's stain, or Masson's trichrome stain.

14. The method of claim 11, further comprising an annotation step of displaying the first and second magnified images side-by-side.

15. The method of claim 11, wherein the registration step further comprises the step of displaying the first and second magnified images superimposed.

16. The method of claim 11, wherein the ground truth mask is formed by performing an annotation step on the second magnified image.

17. The method of claim 11, wherein the ground truth mask is formed by algorithmically creating a ground truth mask in the second magnified image.

18. The method of claim 17, wherein the algorithmically creating the ground truth mask comprises the step of thresholding the second magnified image on certain stain colors and drawing a polygon around regions having pixels with the stain color above the threshold.

19. The method of claim 17, wherein the algorithmically creating the ground truth mask comprises the step of using a trained neural network pattern recognizer trained to recognize cancer cells in stained tissue sample images to operate on the second image and constructing a polygon around regions in the second image deemed by the pattern recognizer to contain cancer cells.

20. A pathology workstation comprising a processing unit and a display, wherein the display is configured to display registered digital magnified images of a single slide containing a tissue sample stained in seriatim (1) with hematoxylin and eosin and (2) a second, different staining agent, respectively,
   wherein the second staining agent comprises an immunohistochemical (IHC) stain that stains cells in the tissue sample that exhibit a specified disease state,
   wherein the workstation is configured with either (a) user interface tools by which an operator inspecting the registered digital magnified images on the display may annotate a digital magnified image of the tissue sample stained with the second staining agent so as to form a closed polygon around a region of said image containing region of interest cells that exhibit the specified disease state to thereby create the ground truth mask, or (b) code to algorithmically create a ground truth mask in said image,
   wherein the workstation is configured to transfer the ground truth mask to the digital magnified image of the tissue sample stained with hematoxylin and eosin; and
   wherein the workstation is configured to, based on the digital magnified image of the tissue sample stained with hematoxylin and eosin and the ground truth mask in the digital magnified image of the tissue sample stained with hematoxylin and eosin, training a neural network pattern analyser to identify regions of interest that exhibit the specified disease state within magnified images that represent tissue samples stained with hematoxylin and eosin.

21. A system comprising:
   the pathology workstation of claim 20;
   a whole slide scanner for scanning stained slides containing the tissue sample; and
   a wash station configured with apparatus and chemicals for washing staining agents from the tissue sample.

22. The pathology workstation of claim 20, wherein the pathology workstation is further configured to:
   obtain a digital magnified image of a single slide containing a target tissue sample stained with hematoxylin and eosin;
   apply the digital magnified image of the target tissue sample to the trained neural network pattern analyser to identify regions of interest that exhibit the specified disease state within the digital magnified image of the target tissue sample; and
   display, on the display, the digital magnified image of the target tissue sample and an indication thereon of the identified regions of interest within the digital magnified image of the target tissue sample.

23. The method of claim 11, further comprising:
   obtaining a target magnified image of a target tissue sample stained with hematoxylin and eosin; and
   applying the target magnified image to the trained neural network pattern analyser to identify regions of interest that exhibit the specified disease state within the target magnified image.

* * * * *